United States Patent [19]

Tomoda et al.

[11] Patent Number: 4,587,429
[45] Date of Patent: May 6, 1986

[54] METHODS OF IMPROVING RADIATION RESISTANT CHARACTERISTIC OF $BF_3$ PROPORTIONAL COUNTERS

[75] Inventors: Toshimasa Tomoda; Shinji Fukakusa; Shinichi Yamashita, all of Amagasaki, Japan

[73] Assignee: Mitsubishi Denki Kabushiki Kaisha, Tokyo, Japan

[21] Appl. No.: 573,915

[22] PCT Filed: Mar. 11, 1983

[86] PCT No.: PCT/JP83/00074

§ 371 Date: Dec. 6, 1983

§ 102(e) Date: Dec. 6, 1983

[30] Foreign Application Priority Data

Apr. 6, 1982 [JP] Japan .................... 57-58706
Sep. 7, 1982 [JP] Japan .................. 57-157254

[51] Int. Cl.⁴ .............................................. G01T 1/18
[52] U.S. Cl. ................................................... 250/375
[58] Field of Search ................................. 250/375, 374

[56] References Cited

U.S. PATENT DOCUMENTS 3,702,409 11/1972 Goodings et al. ............... 313/93

FOREIGN PATENT DOCUMENTS 1267196 3/1972 United Kingdom .

Primary Examiner—Alfred E. Smith
Assistant Examiner—R. Hanig
Attorney, Agent, or Firm—Lowe Price LeBlanc Becker & Shur

[57] ABSTRACT

A method of improving the radiation resistant characteristic of a $BF_3$ proportional counter, comprising a tube having electrodes provided thereon and $BF_3$ gas filled therein, by subjecting the counter before use to any one of $10^4$–$2\times10^5$ R gamma ray, $10^4$–$2\times10^5$ R X-ray, or $10^{10}$–$10^{11}$ nvt thermal neutron with a direct current high voltage applied between the above stated electrodes. The counter thus adapted exhibits little deterioration even in the surroundings of strong gamma ray, X-ray, and thermal neutron flux, and can maintain a stable operation. In particular, since the upper limit of the radiation amount in the process of improving the radiation resistant characteristic is set at a low value, the remaining life of the $BF_3$ proportional counter is not shortened unduely.

6 Claims, 4 Drawing Figures

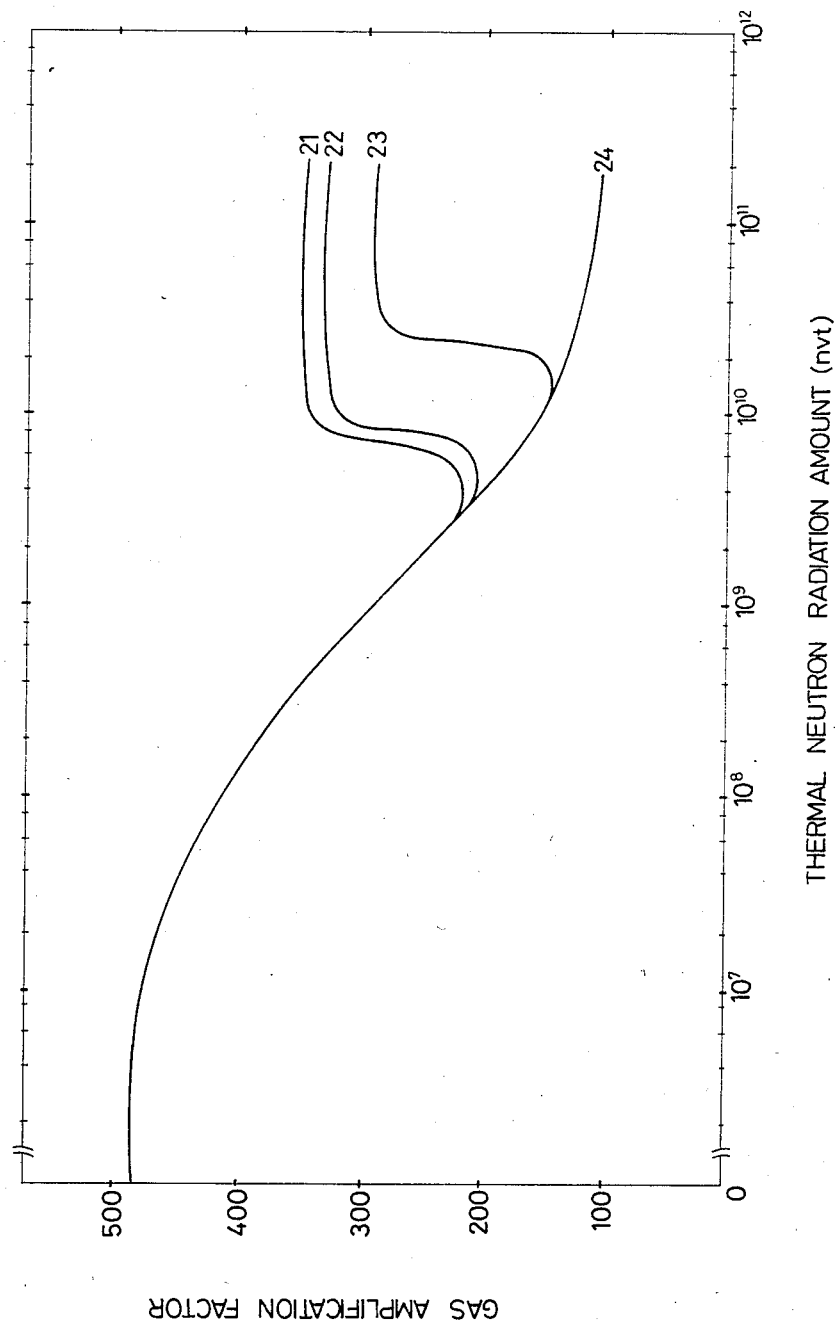

METHODS OF IMPROVING RADIATION RESISTANT CHARACTERISTIC OF BF$_3$ PROPORTIONAL COUNTERS

TECHNICAL FIELD

The present invention relates to an improvement of the radiation resistant characteristic of a boron trifluoride (BF$_3$) proportional counter for use in detecting neutrons.

BACKGROUND ART

As such a proportional counter of this type, one as shown in FIG. 1 has so far been known. Namely, the same comprises a hollow cylindrical cathode (1) having end plates (3a), (3b) hermetically attached to both ends thereof, and an anode (2) mounted between suitable terminals (not shown) provided on the end plates, such that the anode is insulated from the cathode (1) and extends along the axis of the cathode (1). (4) is a gas-filling and evacuating pipe with its one end hermetically connected to the end plate (3a) to be used for filling BF$_3$ gas (5) into the hermetic cylinder forming the cathode (1). The other end plate (3b) is provided with a connector (6) for withdrawing an electrical signal. The internal surface of the cathode (1) is coated with a variety of getters (7) having different operating temperatures, these getters (7) having absorptivity for fluorine gas.

Now the basic operation of a BF$_3$ proportional counter will be described. When neutrons enter the BF$_3$ proportional counter, they react on the isotope $^{10}$B in the BF$_3$ gas filled in the counter and give rise to alpha particles and Li nuclei having high energy. These high energy charge particles ionize BF$_3$ gas molecules, when these pass through the BF$_3$ gas, thereby to give rise to electrons and BF positive ions. This phenomenon is called primary ionization. The thus produced electrons and positive ions are collected respectively by the anode (2) and the cathode (1) with a direct current voltage applied therebetween. In the course of the electrons being collected by the anode, because of a strong electric field in the vicinity of the anode, the electrons are greatly accelerated and, upon collision with BF$_3$ gas molecules, ionize the BF$_3$ gas molecules, producing new electron-ion pairs. The newly produced electrons likewise ionize the BF$_3$ gas molecules. Thus, when these electrons are collected by the anode, the quantity of the charge becomes much larger than that produced in the beginning by the primary ionization. This process is called the gas amplification and normally the quantity of the charge produced by this process is evaluated by way of pulse counting, thereby to make neutron measurement.

Described above is the basic operation of the BF$_3$ proportional counter.

The BF$_3$ proportional counters of high sensitivity are readily available and are widely used for measurement of the low neutron flux. However, the durability thereof is not so good, and a disadvantage was involved that while only impingement of radiation without the counter being put in an operating condition merely entails little deterioration of the characteristic, placement of the counter in an operating condition even under the external radiation of not so high a level gives rise to deterioration in the characteristic within a relatively short period of time, whereby inconveniences are caused in the measurement of neutrons.

Not only the external radiation of neutrons but also that of gamma ray has the same effect in that the output pulses from the counter become gradually smaller.

To improve the radiation resistant characteristic of the counter, there is a report on a method in which, although little deterioration is caused if the counter is subjected only to radiation without the same being put in an operating condition, the counter is subjected to gamma ray radiation of at least 10$^6$ Rads at a rate of at least 10$^5$ Rad/hr while putting the counter in an operating condition, i.e. applying a high direct current voltage. This method results in unlikeliness of deterioration of the characteristic of the BF$_3$ proportional counters after the same is subjected to the above described radiation of the gamma ray. However, the results of our detailed and extensive experiments revealed that disadvantages are involved that not only the method is not easy to practice since it requires a very strong gamma ray source for providing the high ray amount rate of 10$^5$ Rad/hr or more but also subjecting of the counter to radiation of more than a necessary amount of gamma ray shortens the remaining life of the BF$_3$ proportional counter after radiation.

DISCLOSURE OF THE INVENTION

The present invention aims to improve the radiation resistant characteristic of a BF$_3$ proportional counter, which comprises a tube having electrodes provided thereon and BF$_3$ gas filled therein, by subjecting the counter before use to radiation of any one of $10^4$–$2 \times 10^5$ R of gamma ray, $10^4$–$2 \times 10^5$ R of X-ray, and $10^{10}$–$10^{11}$ nvt thermal neutrons, (where nvt=(neutron flux)×(time) in neutrons/cm$^2$) with a predetermined direct current high voltage applied between the above mentioned electrodes. As a result, the counter exhibits little deterioration in the characteristic even in the surroundings of strong gamma ray, X-ray, and thermal neutron flux and can continually provide a stable operation. In particular, since the upper limit of the quantity of radiation is set at a low value, the remaining life of the BF$_3$ proportional counter is not unduly shortened.

Furthermore, since a low level of gamma ray and X-ray source, and thermal neutron flux can be employed, if a gamma ray of lower than 10$^3$ R/hr, an X-ray of lower than 10$^3$ R/hr, thermal neutron flux of lower than 10$^6$ nv in terms of the radiation ray amount rate is used, it is easy to practice.

BRIEF DESCRIPTION OF THE DRAWINGS

FIG. 4 is a characteristic diagram showing with a semilogarithmic scale the variations in the gas amplification factor of the BF$_3$ proportional counter when the counter is subjected to thermal neutron radiation while the counter is put in an operating condition.

BEST MODE FOR CARRYING OUT THE INVENTION

An embodiment of the present invention will be described in the following.

Figure 1:
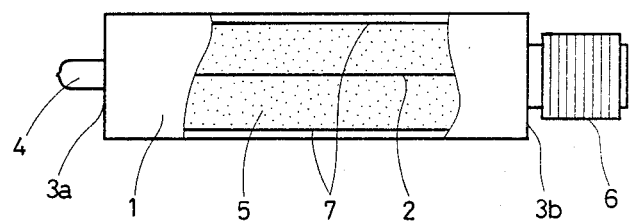
FIG. 1 is a front view of a general BF$_3$ proportional counter, partly fragmentary, for showing the inside.
Figure 2:
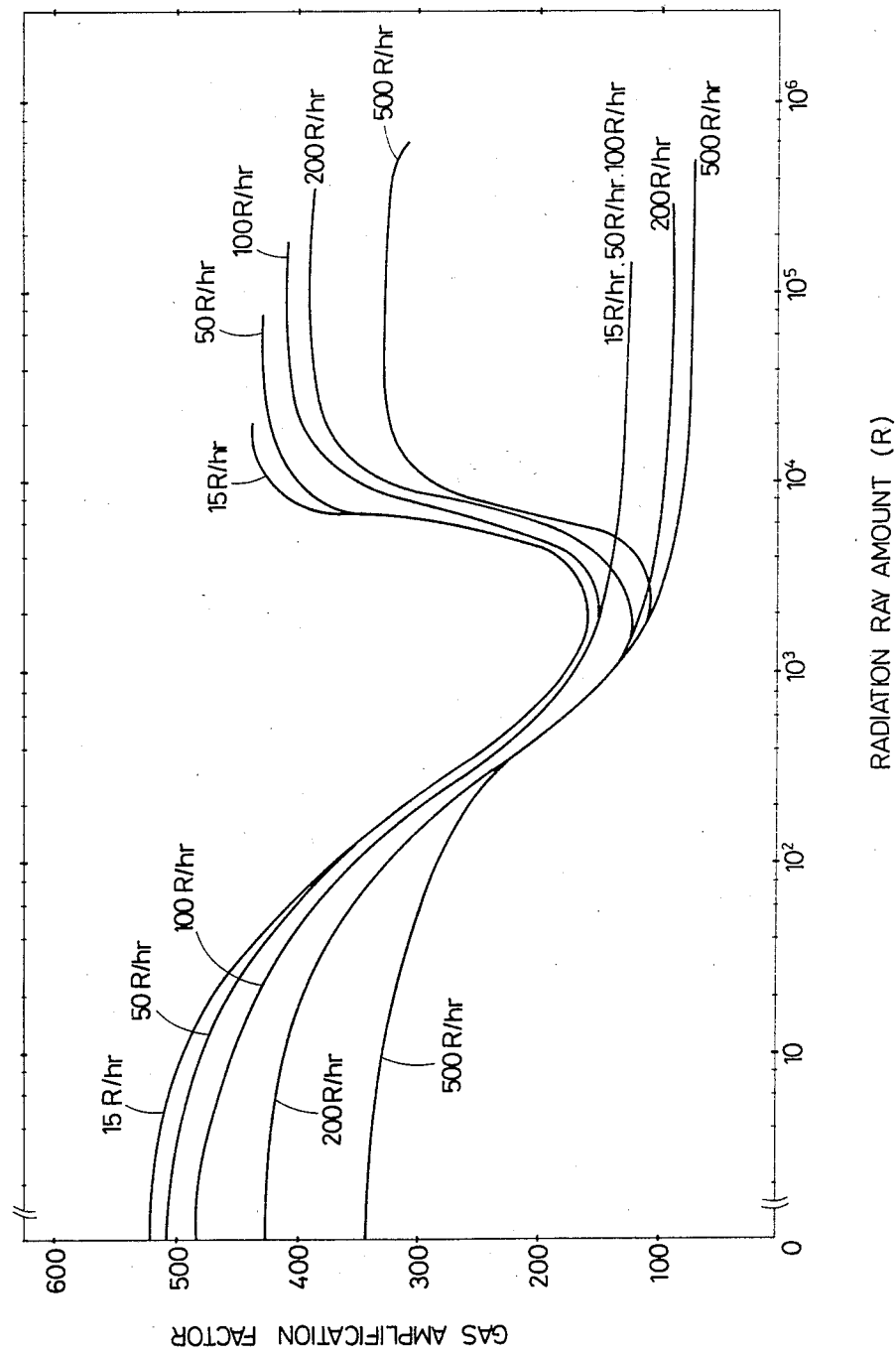
FIG. 2 is a characteristic diagram showing with a semilogarithmic scale the variations in the gas amplification factor of the BF$_3$ proportional counter when the counter is subjected to gamma ray radiation while the counter is put in an operating condition.

FIG. 2 shows variations in the gas amplification factor of the $BF_3$ proportional counter subjected to gamma ray radiation while the radiation ray amount rate is varied, with the counter put in an operating condition, i.e. with a direct current high voltage applied. The counter used for the experiment of the type as shown in FIG. 1 was of 0.025 mm in the outer diameter of the anode wire, 21.8 mm in the inner diameter of the cathode, and 550 Torr in the pressure of the filled-in $BF_3$ gas. The operating voltage, which is usually chosen between 1.1 KV and 2.2 KV, was set at 2 KV during the experiment where the counter was subjected to radiation. The gas amplification factors shown by the ordinate are values obtained at the application of 2 KV and the measurement was made with the same radiation amount rate of gamma radiation as that applied during the previous treatment. The somewhat lower values of the initial values of the gas amplification factors with the higher radiation amount rates are due to the above described fact and are accounted for by the effect of the space charges in the counter. From the diagram, it is seen that the gas amplification factors are virtually determined depending on the accumulated radiation amounts and not on the radiation amount rates, and they generally decrease toward around $2 \times 10^3$ R (R: Roentgen) and are thereafter split into two groups, one group indicating recovery at around $10^4$ R and the other group continuing to decrease. Although there were some diversifications in the values of the accumulated radiation amounts which exhibit initiation of the recovery, those which recovered were stable under succeeding radiation. From a large number of radiation experiments, it has also been found that the ratio between the cases split into two groups is independent of the radiation amount rates. Although not shown, the characteristic of the counter, if not put in an operating condition, is kept stable for the same level of radiation.

Figure 3:
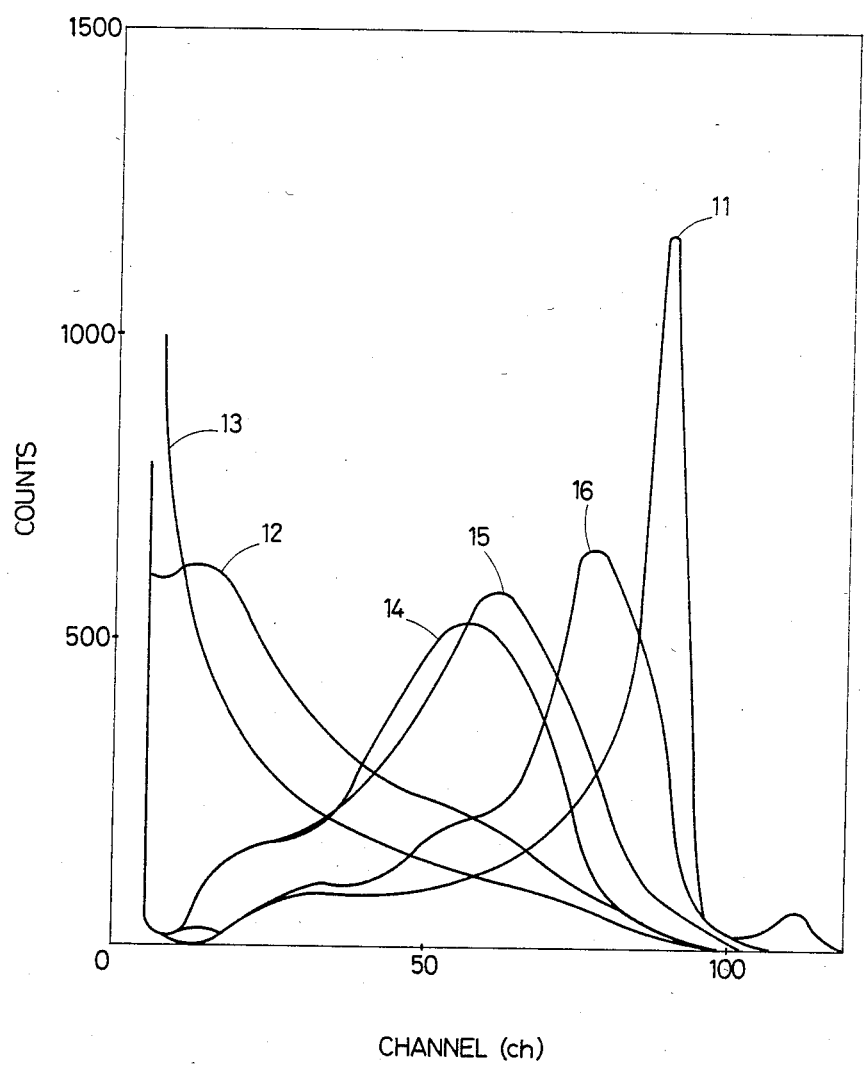
FIG. 3 is a characteristic diagram showing with a linear scale the variations of the pulse-height or channel distribution upon being subjected to the above described gamma ray radiation.

FIG. 3 is a characteristic diagram showing the counts being included within predetermined pulse heights or channels, in which the manner of deterioration and recovery of the $BF_3$ counter that are caused by the radiation of gamma ray are grasped from the aspect of the channel distribution characteristic. Referring to FIG. 3, (11) shows the characteristic before the radiation, (12) shows that after 310 R radiation, (13) shows that after 1600 R radiation, (14) shows that after 6400 R radiation, (15) shows that after 25000 R radiation, and (16) shows that after $2 \times 10^5$ R radiation. From the diagram, it is seen that monotonic deterioration advances toward around 1600 R and thereafter recovery is observed. The channel distribution characteristics for unrecovered $BF_3$ counters, although not shown, remained as deteriorated as shown by the curve (3) in FIG. 2.

From the foregoing description, it is found that the $BF_3$ proportional counters in operation in gamma radiation surroundings all indicate a deterioration phenomenon in which the signal pulse decrease with a relatively small amount of accumulated radiation (about 100–1000 R), but if those counters which recovered their characteristics are selected by subjecting in advance those $BF_3$ counters to gamma radiation of about $10^4$ with the same being put in an operating condition and by determining the characteristic, such counters then do not indicate any deterioration phenomenon and maintain stable characteristics in strong gamma radiation surroundings until very high accumulated radiation amounts are reached. The present invention is particularly effective as in the application to nuclear reactors where the counters measure the neutrons under the condition that gamma radiation is mixed.

In order to cause the counters to recover the characteristics, the large radiation amount above $10^6$ Rad or the high radiation rate above $10^5$ Rad/hr as stated above for the conventional case is not necessary, and rather more radiation than necessary will shorten the remaining life of the counter.

Although in the foregoing, the case was shown in which the applied voltage was 2 KV, the voltage may be changed insofar as it is within the range of the operating voltage of the $BF_3$ proportional counter. Actually, the similar result was obtained in the experiment using the applied voltage of 1.8 KV.

Moreover, although the gamma ray source was used as a radiation source in the foregoing, it is obvious that since the gamma ray and the high energy X-ray are physically the same electromagnetic waves X-ray radiation may also be employed.

FIG. 4 indicates variations in the gas amplification factors of the $BF_3$ proportional counter when the same is subjected to thermal neutron radiation while in an operating condition, i.e. supplied with a direct current high voltage. The $BF_3$ counter used in the experiment was of 0.025 mm in the outer diameter of the anode wire, 21.8 mm in the inner diameter of the cathode, and 350 Torr in the filled-in $BF_3$ gas pressure. The operating voltage is usually chosen between 1.1 KV and 2.2 KV and in the above described experiment 1.7 KV was applied during the neutron radiation. The neutron flux applied was about $10^4$ nv and the gas amplification factor values indicated in the ordinate is that obtained under the applied voltage of 1.7 KV. The gas amplification factor uniformly decreases toward $2 \times 10^9$ nvt, wherefrom the same is divided such that one group of characteristic curves still continues to decrease as (24), whereas the other group indicates initiation of recovery as (21) (22) (23). There are some diversifications in the amounts of radiation where the recovery starts. However, since the diversifications are small, the same do not adversely affect the improvement in the characteristics. The counters which recovered their characteristics are stable under the subsequent neutron radiation. Incidentally, although not shown, $BF_3$ proportional counters in non-operating condition displayed stable characteristics even under the same radiation.

From the foregoing, it was found that when the $BF_3$ proportional counter is put in an operating condition upon application of a high voltage and is subjected to radiation of thermal neutrons, i.e. a counting operation of thermal neutrons is continued, a deterioration phenomenon is observed in which the output pulse channel height decreased for a relatively low radiation amount ($10^8$–$10^9$ nvt); however, when the $BF_3$ proportional counter is put in advance in an operating condition and is subjected to radiation of thermal neutrons of $10^{10}$–$10^{11}$ nvt, whereupon those that have recovered the characteristic are selected, then even by a counting operation of neutrons a stable characteristic is exhibited up to a very high radiation amount or total count value. Meanwhile, although in the foregoing, an example of the applied voltage of 1.7 KV was shown, any other voltage may be used insofar as the applied voltage is in the range of the operation voltage of the BF$_3$ proportional counter.

What is claimed is:

1. A method of improving the radiation resistant characteristic of a BF$_3$ proportional counter, comprising a tube having electrodes provided thereon and BF$_3$ gas filled therein, comprising the step of subjecting the counter before use to any one of $10^4$–$2\times10^5$ R of gamma ray, $10^4$–$2\times10^5$ R of X-ray, and $10^{10}$–$10^{11}$ nvt of thermal neutrons with a direct current high voltage applied between said electrodes.

2. A method of improving the radiation resistant characteristic of a BF$_3$ proportional counter in accordance with claim 1, wherein an operating voltage of the BF$_3$ proportional counter is applied between said electrodes.

3. A method of improving the radiation resistant characteristic of a BF$_3$ proportional counter in accordance with claim 1, wherein the radiation rate of the gamma ray is selected to be $10^3$ R/hr or below.

4. A method of improving the radiation resistant characteristic of a BF$_3$ proportional counter in accordance with claim 1, wherein the radiation rate of the X-ray is selected to be $10^3$ R/hr or below.

5. A method of improving the radiation resistant characteristic of a BF$_3$ proportional counter in accordance with claim 1, wherein thermal neutron flux of $10^6$ nv or below is applied.

6. A method of improving the radiation resistant characteristic of a BF$_3$ proportional counter, comprising a tube having electrodes provided thereon and BF$_3$ gas filled therein, comprising the step of subjecting the counter prior to use of $10^4$–$2\times10^5$ R of gamma rays or X-rays, and with a direct current high voltage applied between said electrodes, wherein the radiation rate of the gamma rays or X-rays are selected to be about 15–$10^3$ R/hr, and said counter is subjected to said gamma rays or X-rays for approximately 10 to $1.3\times10^4$ hours.

* * * * *